(12) United States Patent
Kikuchi

(10) Patent No.: US 7,058,078 B2
(45) Date of Patent: Jun. 6, 2006

(54) COMMUNICATION APPARATUS AND A METHOD OF OPERATING A COMMUNICATION APPARATUS

(75) Inventor: Toru Kikuchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1032 days.

(21) Appl. No.: 09/840,105

(22) Filed: Apr. 24, 2001

(65) Prior Publication Data

US 2001/0033325 A1 Oct. 25, 2001

(30) Foreign Application Priority Data

Apr. 25, 2000 (JP) ............................. 2000-124808
Dec. 15, 2000 (JP) ............................. 2000-381263
Mar. 28, 2001 (JP) ............................. 2001-092387

(51) Int. Cl.
*H04J 3/16* (2006.01)
*H04J 3/22* (2006.01)

(52) U.S. Cl. ...................................... 370/465; 370/236

(58) Field of Classification Search ................ 370/389, 370/392, 465, 468, 470, 471, 229, 230, 235, 370/236, 320, 335, 342, 441; 709/223, 226; 375/240, 240.01, 240.02, 240.12, 240.24
See application file for complete search history.

(56) References Cited

U.S. PATENT DOCUMENTS 6,167,060 A * 12/2000 Vargo et al. ................ 370/468
6,175,856 B1 * 1/2001 Riddle ......................... 709/204
6,260,117 B1 * 7/2001 Freerksen et al. .......... 711/146
6,438,518 B1 * 8/2002 Manjunath et al. ......... 704/219
6,445,697 B1 * 9/2002 Fenton ....................... 370/357
6,493,355 B1 * 12/2002 Henderson et al. ......... 370/468
6,507,611 B1 * 1/2003 Imai et al. ................... 375/222
6,735,175 B1 * 5/2004 Havens ....................... 370/236
6,754,439 B1 * 6/2004 Hensley et al. ............. 386/111
2001/0033237 A1 * 10/2001 Kawai ......................... 341/94

* cited by examiner

*Primary Examiner*—Brian Nguyen
(74) *Attorney, Agent, or Firm*—Fitzpatrick, Cella, Harper & Scinto

(57) ABSTRACT

A communication apparatus is provided that includes a first coding unit for creating first coded data including an audio signal coded by a first audio coding method, a second coding unit for creating second coded data including an audio signal coded by a second audio coding method that is different from the first audio coding method, a control unit for switchably selecting at least one of the first coded data created by the first audio coding method and the second coded data created by the second audio coding method, and a sending unit for sending at least one of the first coded data and the second coded data to another communication apparatus. The sending unit sends the first coded data and the second coded data when the control unit switches selection from the first audio coding method to the second audio coding method while the communication apparatus is in communication with the other communication apparatus. The control unit does not select the second coded data until a predetermined time has passed since the second coding unit starts creating the second coded data.

30 Claims, 11 Drawing Sheets

COMMUNICATION APPARATUS AND A METHOD OF OPERATING A COMMUNICATION APPARATUS

BACKGROUND OF THE INVENTION

1. Field of the Invention

The present invention relates to communication apparatuses which perform several kinds of coding methods and/or decoding methods, and to methods for operating said apparatuses.

2. Description of the Related Art

As a method for switching a coding method during communication with another communicating party, the following methods are known: A first method performs switching after sending a switching request, and a second method performs switching after receiving a response for a switching request.

However, in the first method, since, because there may be a delay between the time when a sending communication apparatus switches from a first coding method to a second coding method and a time when a receiving communication apparatus switches to a decoding method corresponding to the second coding method, at least some of the audio and/or video data coded using the second coding method may be decoded using an inappropriate decoding method. This can cause problems such as undesired noise and/or turbulence of video.

On the other hand, in the second method, because there is a delay between a time when a receiving communication apparatus switches a decoding method and a time when a sending communication apparatus switches a coding method, the receiving communication apparatus also might decode received audio and/or video data using an inappropriate decoding method, and thus, problems such as noise and/or turbulence of video can also occur in this case.

Thus, recently, a method has been proposed wherein audio and/or video data is muted for a certain period of time when a coding method is switched, and then the audio and/or video data is outputted gradually in order to suppress the occurrence of noise and/or turbulence of video. However, in this method, while the occurrence of noise can be suppressed, another problem can occur in that voice and/or video may be interrupted.

Further, among coding methods or decoding methods, there exists a method that feeds back past information for coding or decoding. In this method, if a coding method or a decoding method is switched before coding processing or decoding processing become stable, problems such as noise and/or turbulence of video can occur.

SUMMARY OF THE INVENTION

An object of the present invention is to solve the above-described problems. In accordance with this invention, apparatuses and methods in accordance with various embodiments of the invention are provided which achieve the object of the invention. In one preferred embodiment of the invention, a communication apparatus is provided that includes first coding means for creating first coded data including an audio signal coded by a first audio coding method, second coding means for creating second coded data including an audio signal coded by a second audio coding method that is different from the first audio coding method, control means for switchably selecting at least one of the first coded data created by the first audio coding method and the second coded data created by the second audio coding method, and sending means for sending at least one of the first coded data and the second coded data to another communication apparatus. The sending means sends the first coded data and the second coded data when the control means switches selection from the first audio coding method to the second audio coding method while the communication apparatus is in communication with the other communication apparatus. The control unit does not select the second coded data until a predetermined time has passed since the second coding unit starts creating the second coded data.

In accordance with another aspect of this invention, a method of operating a communication apparatus is provided. The method comprises (a) a first coding step, of creating fire coded data including an audio signal coded by a first audio coding method, (b) a second coding step, of creating second coded data including an audio signal coded by a second audio coding method that is different from the first audio coding method, (c) a control step, of switchably selecting at least one of the first coded data created by the first audio coding method and the second coded data created by the second audio coding method, and (d) a sending step, of sending at least one of the first coded data and the second coded data to another communication apparatus. The sending step includes sending the first coded data and the second coded data when the control step switches selection from the first audio coding method to the second audio coding method while the communication apparatus is in communication with the other communication apparatus. The control step does not select the second coded data until a predetermined time has passed since the second coding step has started creating the second coded data.

A communication apparatus in accordance with another embodiment of the present invention comprises receiving means for receiving at least one of first coded data including an audio signal coded by a first audio coding method and second coded data including an audio signal coded by a second audio coding method that is different from the first audio coding method, first decoding means for decoding the first coded data, second decoding means for decoding the second coded data, control means for switchably selecting at least one of an audio signal outputted from the first decoding means and an audio signal outputted from the second decoding means, and output means for outputting the audio signal selected by the control means. The receiving means receives the first coded data and the second coded data when the control means switches selection from the first audio coding method to the second audio coding method while the communication apparatus is in communication with another communication apparatus. The control means does not select the audio signal outputted from the second decoding means until a predetermined time has passed since the second decoding means starts decoding the second coded data.

A method of operating a communication apparatus according to another embodiment of the present invention comprises (a) a receiving step, of receiving at least one of first coded data including an audio signal coded by a first audio coding method and second coded data including an audio signal coded by a second audio coding method that is different from the first audio coding method, (b) a first decoding step, of decoding the first coded data, (c) a second decoding step, of decoding the second coded data, (d) a control step, of switchably selecting at least one of an audio signal outputted in the first decoding step and an audio signal outputted in the second decoding step, and (e) an output step, of outputting the audio signal selected in the control step. The receiving step in this embodiment includes receiving the first coded data and the second coded data when the control step switches selection from the first audio coding method to the second audio coding method while the communication apparatus is in communication with another communication apparatus. The control step does not select the audio signal outputted in the second decoding step until a predetermined time has passed since the second decoding step starts decoding the second coded data.

A communication apparatus according to another embodiment of the present invention comprises a first coder, arranged for creating first coded data including an audio signal coded by a first audio coding method, and a second coder, arranged for creating second coded data including an audio signal coded by a second audio coding method that is different from the first audio coding method. A controller switchably selects at least one of the first coded data created by the first audio coding method and the second coded data created by the second audio coding method, and a sender is arranged for sending at least one of the first coded data and the second coded data to another communication apparatus. The sender sends the first coded data and the second coded data when the controller switches selection from the first audio coding method to the second audio coding method while the communication apparatus is in communication with the other communication apparatus. The controller does not select the second coded data until a predetermined time has passed since the second coder starts creating the second coded data.

A communication apparatus according to another embodiment of the present invention comprises a receiver, arranged for receiving at least one of first coded data including an audio signal coded by a first audio coding method and second coded data including an audio signal coded by a second audio coding method that is different from the first audio coding method. A first decoder is arranged for decoding the first coded data, and a second decoder is arranged for decoding the second coded data. A controller switchably selects at least one of an audio signal outputted from the first decoder and an audio signal outputted from the second decoder. An outputter outputs the audio signal selected by the controller. The receiver receives the first coded data and the second coded data when the controller switches selection from the first audio coding method to the second audio coding method while the communication apparatus is in communication with another communication apparatus. The controller does not select the audio signal outputted from the second decoder until a predetermined time has passed since the second decoder starts decoding the second coded data.

Still other objects of the present invention, and the advantages thereof, will become fully apparent from the following detailed description of the various embodiments of the present invention.

DETAILED DESCRIPTION OF THE PREFERRED EMBODIMENTS

The preferred embodiments of the present invention will now be described in detail, with reference to the accompanying drawings.

Embodiment 1

Figure 1:
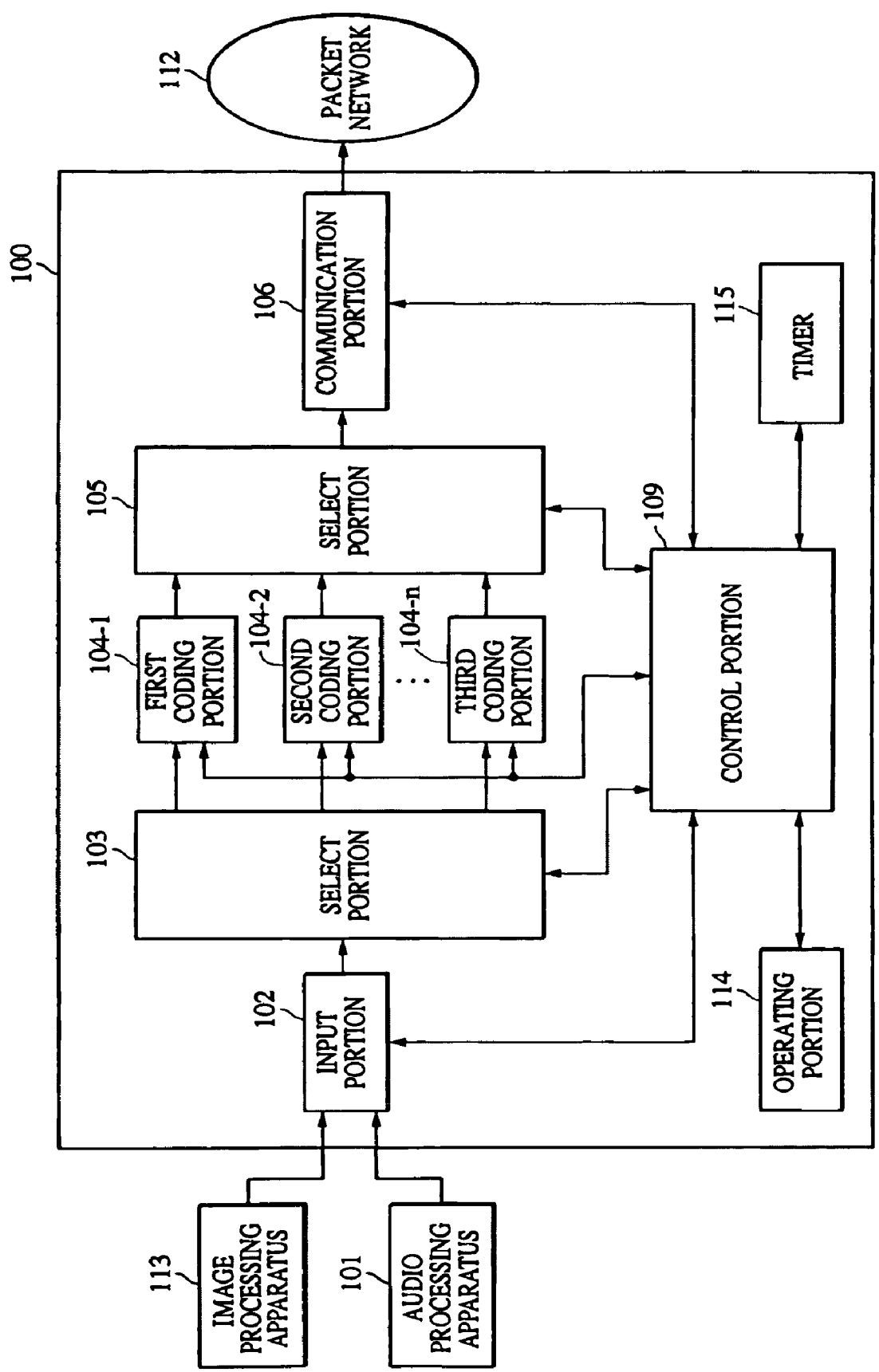
FIG. 1 is a block diagram showing the construction of a packet communication apparatus (sending side) according to a first embodiment of the present invention.

FIG. 1 is a block diagram showing an example of a packet communication apparatus (sending/transmitting side) constructed according to a first embodiment of the present invention.

The apparatus of FIG. 1 includes a packet communication apparatus (sending side) 100 according to a first embodiment, an audio processing apparatus 101, a packet network 112, and an image processing apparatus 113. The audio processing apparatus 101, includes a microphone or a voice playback apparatus, for example, and outputs analog audio signals in a predetermined audio format. The packet network 112 includes for example a Local Area Network (LAN), a Wide Area Network (WAN), the Internet, a satellite communication line, a serial bus or wireless LAN compliant with the IEEE1394-1995 standard or some other suitable type of network. The image processing apparatus 113 preferably includes a video camera or a video playback apparatus and outputs analog video signals in a predetermined video format. In other embodiments, the audio processing apparatus 101 and/or the image processing apparatus 113 may be included within the packet communication apparatus 100, although this is not shown in the first embodiment of FIG. 1.

Further, FIG. 1 includes an input portion 102, a select portion 103, and a control portion 109. The input portion 102 converts analog audio signals outputted from the audio processing apparatus 101 to digital audio signals and/or converts analog video signals outputted from the video processing apparatus 113 to digital video signals. The select portion 103 supplies audio and/or video signals outputted from the input portion 102 to at least one coding portion 104-1 to 104-n in accordance with an instruction from the control portion 109.

Each coding portion 104-1 to 104-n codes audio or/and video signals having a same content by using a predetermined, respective audio or video coding method of the coding portion 104-1 to 104-n. An audio coding method employed by each coding portion 104-1 to 104-n may be in accordance with, for example, the Moving Picture Experts Group (MPEG) 1 audio method compliant with the ISO/IEC 20 13818-3 standard, the Adaptive Differential PCM (AD-PCM) method, Sub-band ADPCM (SB-ADPCM) method, or Low-Delay Code Excited Linear Prediction (LD-CELP) method. Further, the video coding method employed by each coding portion 104-1 to 104-n may include, for example, the MPEG 1 method compliant with the 25 ISO/IEC 11172-2 standard or the MPEG 2 method compliant with the ISO/IEC 13818-2 standard. It should be noted that the audio coding method and video coding method of each coding portion 104-1 to 104-n preferably differs for every other coding portion 104-1 to 104-n.

Further, FIG. 1 includes a select portion 105, a communication portion 106, an operating portion 114, and a timer 115. The select portion 105 supplies coded data outputted from at least one coding portion 104-1 to 104-n in accordance with an instruction from control portion 109.

Figure 2:
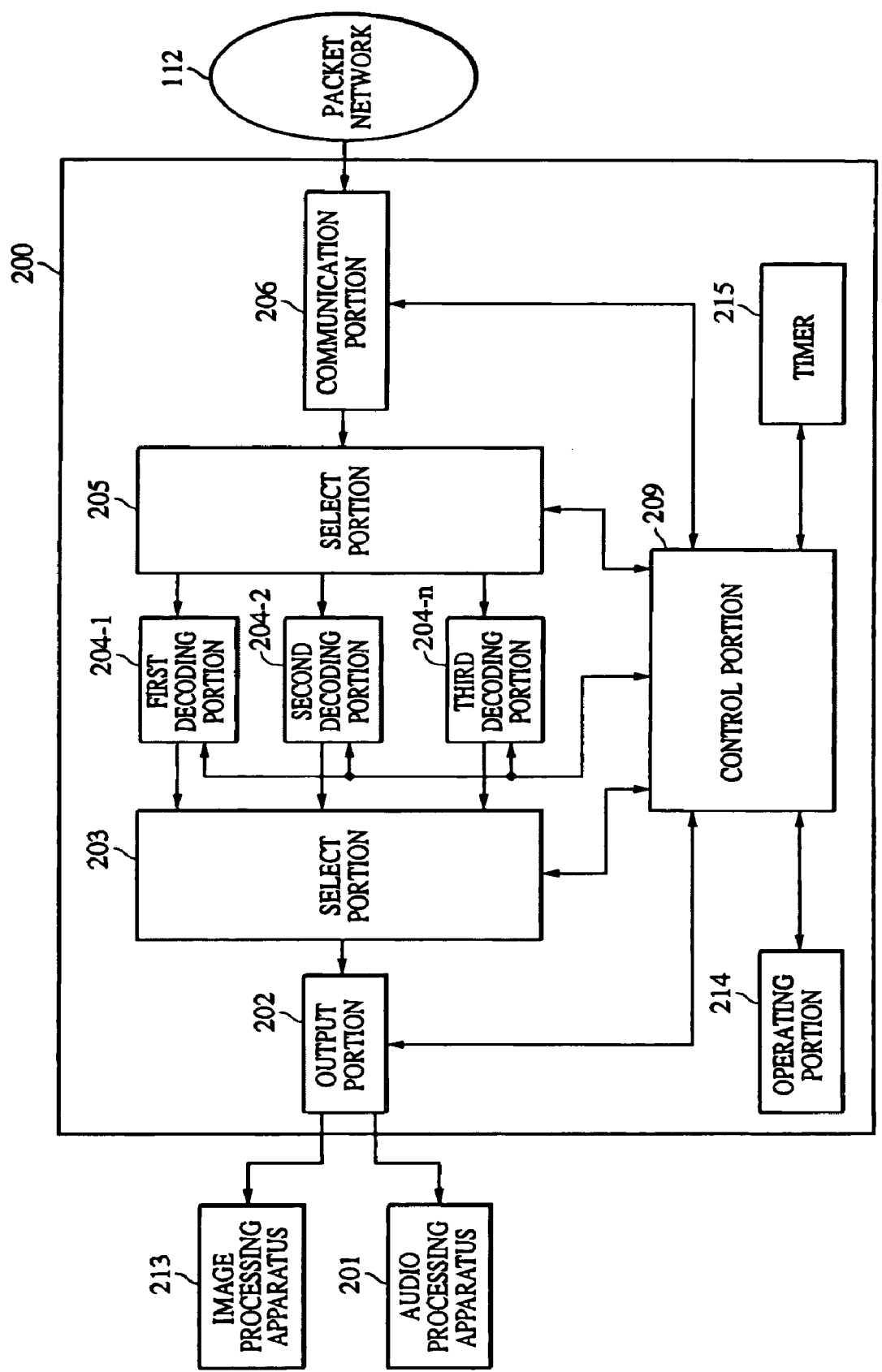
FIG. 2 is a block diagram showing the construction of a packet communication apparatus (receiving side) according to the first embodiment of the present invention.

The communication portion 106 creates a data packet including coded data outputted from the select portion 105 and sends the created data packet to another packet communication apparatus (e.g., FIG. 2). Further, the communication portion 106 creates a control packet including control data (e.g., a switching request, switching response, switching confirmation, for example, described below) outputted from the control portion 109 and sends the created control packet to the other packet communication apparatus. Furthermore, the communication apparatus 106 receives a control packet sent from the other packet communication apparatus through the network 112 and supplies control data (e.g., a switching request, switching response, switching confirmation, for example, described below) included in the received control packet to the control portion 109. The communication portion 106 preferably includes a LAN controller, a Transmission Control Protocol/Internet Protocol (TCP/IP) Protocol stack, a serial bus controller or a wireless LAN controller, for example.

The control portion 109 controls the overall operation of the packet communication apparatus 100 (sending side) by following processing steps described below. It should be noted that the control portion 109 preferably includes a microcomputer, a memory and different kinds of control programs for implementing those processing steps. The operating portion 114 displays a currently selected coding method, displays a selectable coding method, or inquires a user about a coding method after switching occurs, as will be described below. The timer 115 measures a time that is sufficient enough for enabling processing steps of a switched coding method to be acceptably stable.

FIG. 2 is a block diagram showing an example of a packet communication apparatus (receiving side) constructed according to the first embodiment of the present invention.

The apparatus of FIG. 2 preferably includes a packet communication apparatus (receiving side) 200, an audio processing apparatus 201, and an image processing apparatus 213. The audio processing apparatus 201 preferably includes a speaker or an audio recording apparatus. The image processing apparatus 213 preferably includes a video recording apparatus or a display apparatus such as a CRT, a liquid crystal panel, or a plasma display panel. In other embodiments the audio processing apparatus 201 and/or the image processing apparatus 213 may be included within the packet communication apparatus 200, although this is not shown in FIG. 2.

Further, the packet communication apparatus 200 preferably comprises a communication portion 206, a select portion 205, and a control portion 209. The communication portion 206 receives data packets sent from another packet communication apparatus such as, for example, the apparatus shown in FIG. 1, and supplies coded data included in the received data packet to the select portion 205. Further, the communication portion 206 receives a control packet sent from the other packet communication apparatus and supplies control data (e.g., a switching request, switching response, switching confirmation, described below) included in the received control packet to the control portion 209. Further, the communication portion 206 creates a control packet including the control data (e.g., switching request, switching response, switching confirmation, for example, described below) supplied from the control portion 209 and sends the created control packet to the other packet communication apparatus. The communication portion 206 preferably includes a LAN controller, a Transmission Control Protocol/Internet Protocol (TCP/IP) Protocol stack, a serial bus controller or a wireless LAN controller, for example.

The select portion 205 supplies coded data outputted from the communication portion 206 to at least one selected decoding portion 204-1 to 204-n in accordance with an instruction from the control portion 209.

Each decoding portion 204-1 to 204-n decodes audio or/and video signals having a same content according to a corresponding predetermined decoding method. An audio decoding method employed in each decoding portion 204-1 to 204-n corresponds to an audio coding method employed by the same coding portion 104-1 to 104-n. Further, a video coding method employed by each decoding portion 204-1 to 204-n corresponds to a video coding method performed by coding portion 104-1 to 104-n. It should be noted that the audio decoding method and video decoding method employed by each decoding portion 204-1 to 204-n differs from those employed by the decoding portion 204-1 to 204-n.

The select portion 203 supplies audio and/or video signals outputted from at least one selected decoding portion 204-1 to 204-n to an output portion 202, in accordance with an instruction from the control portion 209.

The output portion 202 converts digital audio signals outputted from the select portion 203 to analog audio signals and supplies the converted analog audio signals to the audio processing apparatus 201.

The output portion 202, also converts digital video signals outputted from the select portion 203 to analog video signals and supplies the converted analog video signals to the image processing apparatus 213.

The control portion 209 controls the overall operation of the packet communication apparatus 200 (receiving side) by following processing steps described below. It should be noted that the control portion 209 preferably includes a microcomputer, a memory and various types of control programs. The operating portion 214 displays a currently selected coding method, displays a selectable coding method, or inquires of a user about a coding method after switching occurs. The timer 215 measures an amount of a time that is sufficient enough for enabling processing steps of the switched coding method to become substantially stable.

Next, by referring to FIG. 8, a construction of a data packet according to a first embodiment of the present invention will be described.

Figure 8:
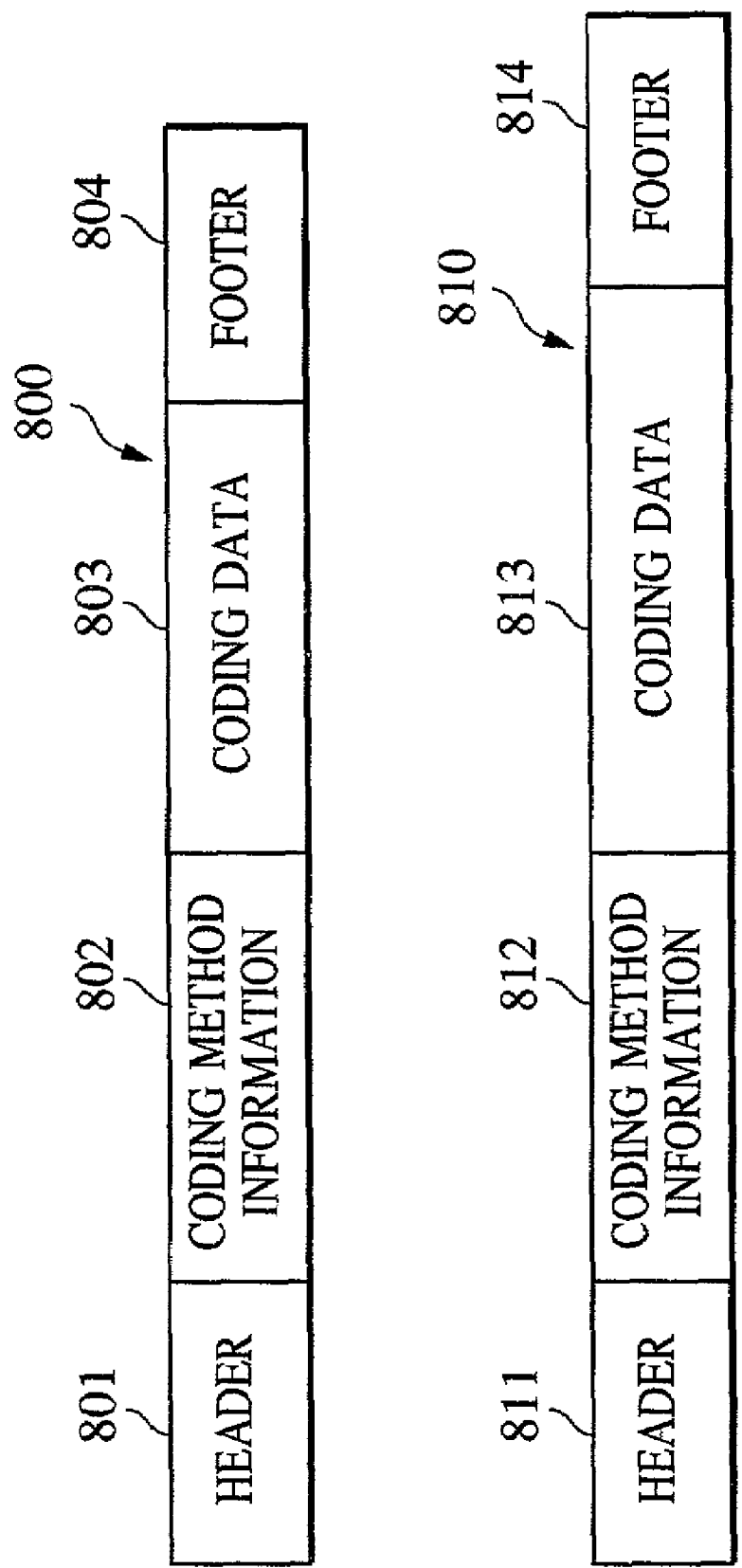
FIG. 8 is a diagram showing the construction of a data packet according to the first embodiment of the present invention.

As shown in FIG. 8, a data packet 800 according to the first embodiment includes a header 801, coding method information 802, coded data 803, and a footer 804. The header 801 includes information for identifying a communicating party, for example. The coding method information 802 includes information indicating a coding method for the coded data 803 and a decoding method corresponding thereto. The coded data 803 includes audio and/or video signals coded by using a first coding method (prior to switching) (a first coding method that a first coding portion 104-1 includes). The footer 804 includes information for detecting or correcting an error occurred in a data packet, for example.

Further, as shown in FIG. 8, another data packet 810 according to the first embodiment includes a header 811, coding method information 812, coded data 813 and a footer 814. The header 811 includes information for identifying a communicating party, for example. The coding method information 812 includes information indicating a coding method for the coded data 813 and a decoding method corresponding thereto. The coded data 813 includes audio and/or video signals coded by using a coding method after switching (a second coding method that a second coding portion 104-2 includes). The footer 814 includes information for detecting or correcting an error that occurred in a data packet, for example.

Figure 3:
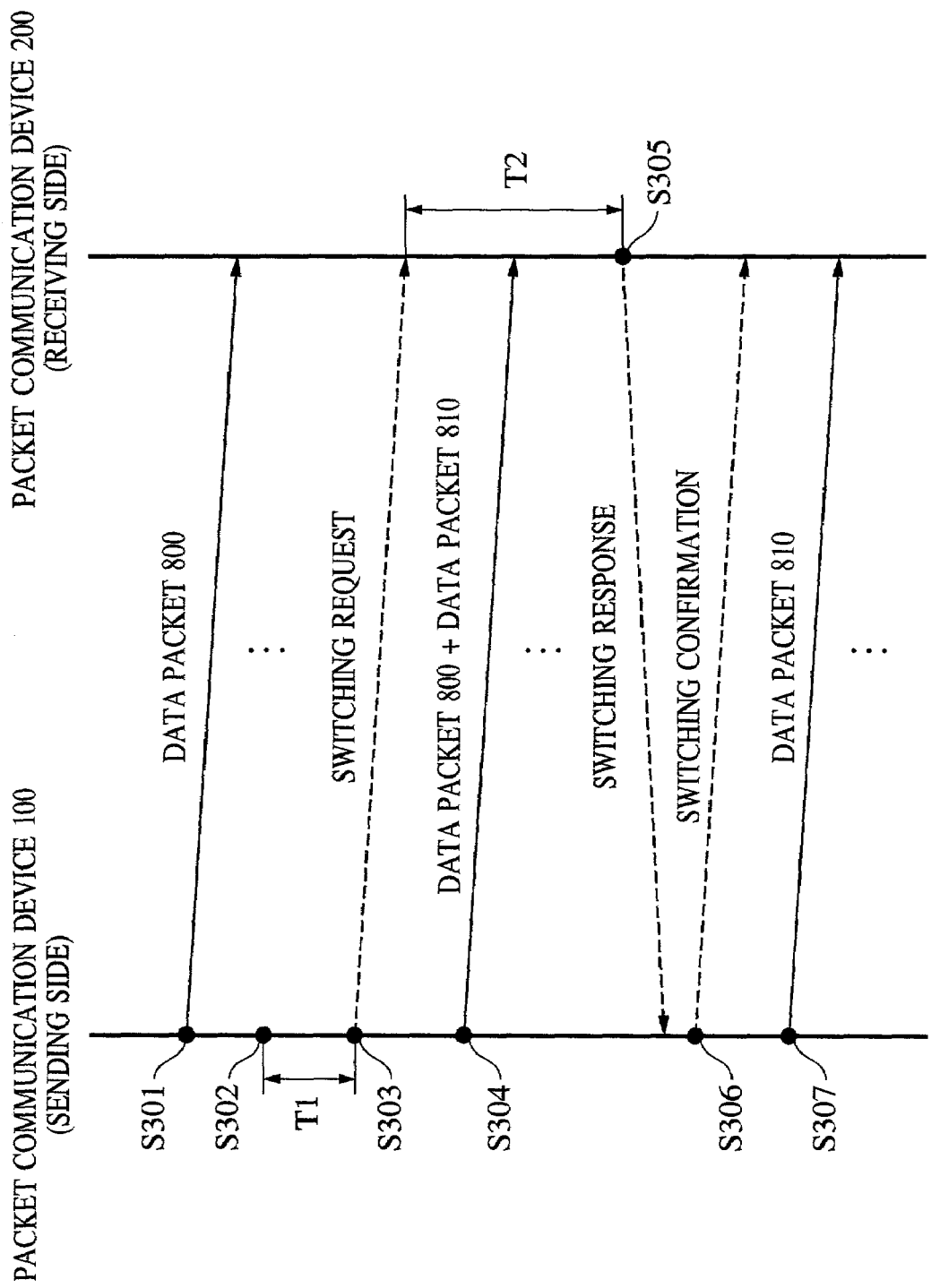
FIG. 3 is a diagram for describing one example of main processing steps of a packet communication apparatus according to the first embodiment of the present invention.

Next, by referring to FIG. 3, an example will be described of main processing steps of packet communication apparatuses 100 and 200 according to the first embodiment. In FIG. 3, processing steps will be described for an exemplary case where, during communication with the packet communication apparatus 200 (receiving side), the packet communication apparatus 100 (sending side) requests switching of a coding method. Further, FIG. 3 will be described in the context where the coding method before switching is a first coding method employed by a first coding portion 104-1, while the coding method after switching is a second coding method that a second coding portion 104-2 employs, for example.

First of all, a processing step S301 will be described. The input portion 102 converts analog audio signals outputted from the audio processing apparatus 101 to digital audio signals. Also, the input portion 102 converts the analog video signals output from the image processing apparatus 113 to digital video signals. The select portion 103 supplies audio and/or video signals outputted from the input portion 102 to the first coding portion 104-1. The first coding portion 104-1 codes the audio and/or video signals supplied from the select portion 103 and creates coded data 803, sequentially. The select portion 105 supplies the coded data 803 outputted from the first coding portion 104-1 to the communication portion 106, which, in turn, creates a data packet 800 including the coded data 803, sequentially, and sends it to the packet communication apparatus 200 sequentially through the packet network 112.

At the packet communication apparatus 200, the communication portion 206 sequentially receives the data packet 800 sent from the packet communication apparatus 100 and supplies coding method information 802 to the control portion 209. The control portion 209 determines a coding method for the coded data 803 and a decoding method corresponding thereto based on the coding method information 802. The select portion 205 sequentially supplies the coded data 803 to the first decoding portion 204-1. The first decoding portion 204-1 decodes the coded data 803 by using a first decoding method corresponding to the first coding method and creates audio and/or video signals. The select portion 203 supplies audio and/or video signals outputted from the first decoding portion 204-1 to the output portion 202. The output portion 202 converts the digital audio signals received from the select portion 203 to the analog audio signals or digital video signals received from the select portion 203 to the analog video signals (depending on which type of signal was received). Then, the output portion 202 supplies the analog audio signals to the audio processing apparatus 201 and/or the analog video signals to the image processing apparatus 213.

Next, processing step S302 will be described. In step S302, the control portion 109 apparatus 100 determines whether or not the coding method needs to be switched from the first coding method to the second coding method. For example, when the control portion 109 detects a change in traffic in the packet network 112 and automatically determines that the coding methods needs to be changed from the first method to the second method, the control portion 109 switches the coding method from the first coding method to the second coding method (i.e., from 104-1 to 104-2). Further, when a user manipulates the operating portion 114 in order to instruct to change the coding method from the first coding method to the second coding method, for example, the control portion 109 switches the coding method from the first coding method to the second coding method. When the coding method is switched from the first coding method to the second coding method, the control portion 109 starts preparation for coding audio and/or video signals having a same content by using a coding method before switching and a coding method after switching. The timer 115 starts measuring a predetermined time T1 (a time period sufficiently long enough for enabling the operation of the coding portion 104-2 to become stable) in accordance with an instruction from the control portion 109. The select portion 103 supplies the audio and/or video signals having a same content to the first coding portion 104-1 and the second coding portion 104-2 in accordance with an instruction from the control portion 109. The select portion 105 supplies the coded data 803 outputted from the first coding portion 104-1 to the communication 106 in accordance with an instruction from the control portion 109. However, the select portion 105 does not supply the coded data 813 outputted from the second coding portion 104-2 to the communication portion 106. It should be noted that, until a predetermined time T1 has passed (a time period sufficiently long enough for enabling the operation of the second coding portion 104-2 to become stable), the coded data 813 outputted from the second coding portion 104-2 is prevented from being supplied to the communication portion 106 by the select portion 105.

Next, a processing step of a step S303 will be described. After the predetermined time T1 has passed (that is, after the coding processing of the second coding portion 104-2 has become stable), the control portion 109 supplies control data for requesting switching of the coding method (referred to as a "switching response" below) to the communication portion 106. The communication portion 106 creates a control packet including a switching request and sends this to the packet communication apparatus 200.

The communication portion 206 of the apparatus 200 thereafter receives the control packet (including the switching request) sent from the packet communication apparatus 100. In response to the request, the control portion 209 starts preparation for switching the coding method from the first coding method to the second coding method after receiving the switching request. Further, the timer 215 starts measuring a predetermined time T2 (a time sufficiently long enough for enabling an operation of the second decoding portion 204-2 to become stable) in accordance with an instruction from the control portion 209 in response to receiving the request.

Next, a processing step S304 will be described. The select portion 105 supplies to the communication portion 106 the coded data 803 outputted from the first coding portion 104-1 and the coded data 813 outputted from the second coding portion 104-2 in accordance with the control portion 109. The communication portion 106 creates a data packet 800 including the coded data 803 and a data packet 810 including the coded data 813 sequentially and sends them to the packet communication apparatus 200 in sequence. It should be noted that the communication portion 106 starts sending the data packet 800 and the data packet 810 without connecting a new call with the packet communication apparatus 200.

The communication portion 206 sequentially receives the data packet 800 and the data packet 810 sent from the packet communication apparatus 100 and supplies the coded data 803 and the coded data 813 to the select portion 205 and the coding method information 802 and 812 to the control portion 209. The control portion 209 determines a coding method for the coded data 803 and a decoding method corresponding thereto based on the coding method information 802 and determines a coding method for the coded data 813 and a decoding method corresponding thereto based on the coding method information 812. The select portion 205 supplies the coded data 803 to the first decoding portion 204-1 and coded data 813 to the second decoding portion 204-2 in accordance with an instruction from the control portion 209. The select portion 203 supplies audio and/or video signals outputted from the first decoding portion 204-1 to the output portion 202 in accordance with an instruction from the control portion 209. However, the audio and/or video signals outputted from the second decoding portion 204-2 is prevented from being supplied to the output portion 202. The select portion 203 does not supply audio and/or video signals outputted from the second decoding portion 204-2 until the predetermined time T2 (an amount of time sufficiently long enough for enabling an operation of the second decoding portion 204-2 to become stable) has passed.

Next, a processing step S305 will be described. After the predetermined time T2 has passed (that is, after the decoding processing by the second decoding portion 204-2 becomes stable), the select portion 203 supplies audio and/or video signals outputted from the second decoding portion 204-2 to the output portion 202 in accordance with an instruction from the control portion 209. However, audio and/or video signals outputted from the first decoding portion 204-1 are prevented from being supplied to the output portion 202. The output portion 202 converts digital audio signals from the select portion 203 to analog audio signals and the digital video signals from the select portion 203 to the analog video signals. Then, the output portion 202 supplies the analog audio signals to the audio output apparatus 201 and analog video signals to the apparatus 213. Further, the control portion 209 supplies control data corresponding to a switching request (referred to as a "switching response" below) to the communication portion 206. The communication portion 206 creates a control packet including the switching response and then sends the packet to the packet communication apparatus 100.

The communication portion 106 then receives the control packet (including the switching response) sent from the packet communication apparatus 200. The control portion 109 receives the switching response and then terminates processing for coding audio and/or video signals by using the first coding method.

Next, a processing step S306 will be described. The control portion 109 receives the switching response and then supplies a switching confirmation to the communication portion 106. The communication portion 106 creates a control packet including the switching confirmation and then sends it to the packet communication apparatus 200.

Next, a processing step S307 will be described. The select portion 103 supplies audio and/or video signals outputted from the input portion 102 to the second coding portion 104-2 but not to the first coding portion 104-1 in accordance with an instruction from the control portion 109. Further, the select portion 105 supplies coded data 813 outputted from the second coding portion 104-2 to the communication portion 106 in accordance with an instruction from the control portion 109. The communication portion 106 creates, in sequence, a data packet 810 including the coded data 813 and sends it in sequence to the packet communication apparatus 200. Since the packet communication apparatus 200 switches the coding method from the first coding method to the second coding method, the data packet 810 sent from the packet communication apparatus 100 can be decoded without any problems, which also can prevent the occurrence of noise, video turbulence and/or audio and/or video interruption.

Figure 4:
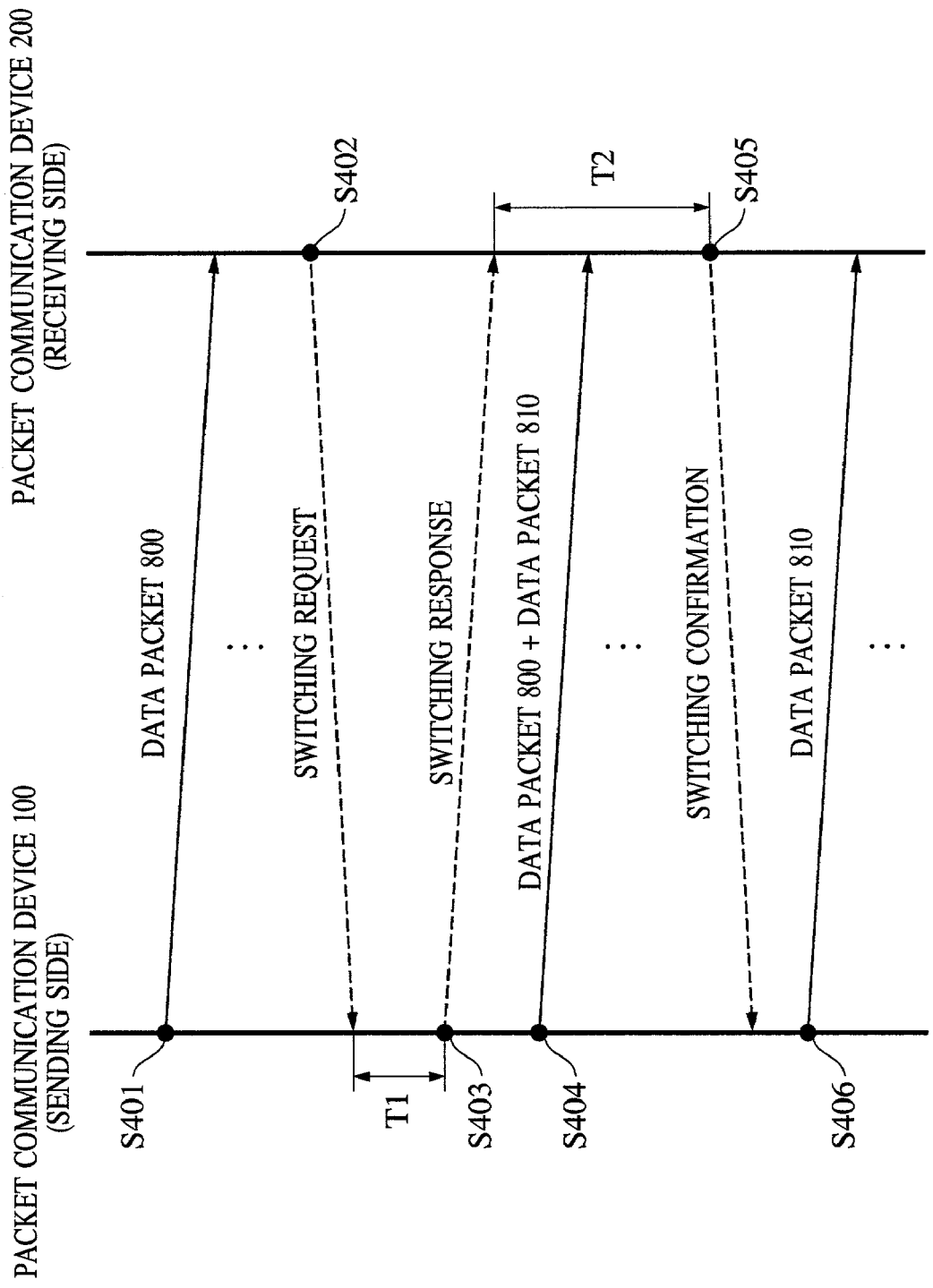
FIG. 4 is a diagram for describing another example of main processing steps of a packet communication apparatus according to the first embodiment of the present invention.

Next, by referring to FIG. 4, another example of main processing steps performed by the packet communication apparatuses 100 and 200 according to the first embodiment will be described. In FIG. 4, during communication with the packet communication apparatus 100 (sending side), processing steps will be described wherein the packet communication apparatus 200 (receiving side) requests for switching a coding method. Further, in FIG. 4, like the description on FIG. 3, a case will be described wherein it is assumed that the coding method before switching is, for example, a first coding method employed by the first coding portion 104-1 and the coding method after switching is, for example, a second coding method employed by the second coding portion 104-2.

First, a processing step S401 will be described. The processing step S401 is the same as the processing step S301 described above, and thus the step S401 will not be described in further detail herein.

Next, a processing step S402 will be described. The control portion 209 determines whether or not the coding method must be switched from the first coding method to the second coding method. For example, when the control portion 209 detects a change in traffic in the packet network 112 and automatically determines that the coding method must be changed from the first coding method to the second coding method, the control portion 209 switches the coding method from the first coding method to the second coding method. Further, when a user manipulates the operating portion 214 to change the coding method from the first coding method to the second coding method, the control portion 209 switches the coding method from the first coding method to the second coding method. When the coding method has been switched from the first coding method to the second coding method, the control portion 209 supplies control data for requesting switching of the coding method (called "switching request" below) to the communication portion 206. The communication portion 206 creates a control packet including the switching request and then sends it to the packet communication apparatus 100.

The communication portion 106 then receives the control packet (including the switching request) sent from the packet communication apparatus 200. After receiving the switching request, the control portion 109 starts preparation for coding audio and/or video signals having a same content by using the first and second coding methods. Further, the timer 115 starts measuring a predetermined time T1 (an amount of time sufficient enough for enabling the operation of the second coding portion 104-2 to become stable) in accordance with an instruction from the control portion 109. The select portion 103 supplies the audio and/or video signals having a same content to the first coding portion 104-1 and the second coding portion 104-2 in accordance with an instruction from the control portion 109. The select portion 105 supplies coded data 803 from the first coding portion 104-1 to the communication portion 106 in accordance with an instruction from the control portion 109 but prevents coded data 813 outputted from the second coding portion 104-2 from being supplied to the communication portion 106. It should be noted that, until the predetermined time T1 passes (an amount of time sufficient enough for enabling the operation of the second coding portion 104-2 to become stable), the coded data 813 outputted from the second coding portion 104-2 is prevented from being supplied to the communication portion 106.

Next, a processing step S403 will be described. After the predetermined time T1 has passed (that is, after the coding processing of the second coding portion 104-2 has become stable), the control portion 109 supplies a switching response to the communication portion 106. The communication portion 106 then creates a control packet including the switching response and sends this to the packet communication apparatus 200 via the network 112.

The communication portion 206 thereafter receives the control packet (including the switching response) sent from the packet communication apparatus 100, and supplies the packet to control portion 209. The control portion 209 then starts preparation for switching the coding method from the first coding method to the second coding method after receiving the switching response. Further, the timer 215 starts measuring a predetermined time T2 (a time sufficiently long enough for enabling an operation of the second decoding portion 204-2 to become stable) in accordance with an instruction from the control portion 209.

Next, a processing step S404 will be described. The select portion 105 supplies to the communication portion 106 the coded data 803 outputted from the first coding portion 104-1 and the coded data 813 outputted from the second coding portion 104-2 in accordance with a signal from the control portion 109. The communication portion 106 creates a data packet 800 including the coded data 803 and a data packet 810 including the coded data 813 sequentially and sends them to the packet communication apparatus 200 sequentially. It should be noted that the communication portion 106 starts sending the data packet 800 and the data packet 810 without connecting a new call with the packet communication apparatus 200.

The communication portion 206 sequentially receives the data packet 800 and the data packet 810 sent from the packet communication apparatus 100 and supplies the coded data 803 and the coded data 813 to the select portion 205 and the coding method information 802 and 812 to the control portion 209. The control portion 209 determines a coding method for the coded data 803 and a decoding method corresponding thereto based on the coding method information 802 and determines a coding method for the coded data 813 and a decoding method corresponding thereto based on the coding method information 812. The select portion 205 supplies the coded data 803 to the first decoding portion 204-1 and coded data 813 to the second decoding portion 204-2 in accordance with an instruction from the control portion 209. The select portion 203 supplies audio and/or video signals outputted from the first decoding portion 204-1 to the output portion 202 in accordance with an instruction from the control portion 209. However, the audio and/or video signals outputted from the second decoding portion 204-2 is prevented from being supplied to the output portion 202. The select portion 203 does not supply audio and/or video signals outputted from the second decoding portion 204-2 until the predetermined time T2 (a time sufficiently long enough for enabling an operation of the second decoding portion 204-2 to become stable) has passed.

Next, a processing step S405 will be described. After the predetermined time T2 has passed (that is, after the decoding processing by the second decoding portion 204-2 becomes stabilized), the select portion 203 supplies audio and/or video signals outputted from the second decoding portion 204-2 to the output portion 202 in accordance with an instruction from the control portion 209. However, audio and/or video signals outputted from the first decoding portion 204-1 are prevented from being supplied to the output portion 202. The output portion 202 converts digital audio signals received from the select portion 203 to analog audio signals and the digital video signals received from the select portion 203 to the analog video signals. Then, the output portion 202 supplies the analog audio signals to the audio processing apparatus 201 and analog video signals to the image processing apparatus 213. Further, the control portion 209 supplies a switching confirmation to the communication portion 206. The communication portion 206 then creates a control packet including the switching confirmation and sends it to the packet communication apparatus 100 via the network 112.

The communication portion 106 of the apparatus 100 then receives the control packet (including the switching confirmation) sent from the packet communication apparatus 200 and supplies the switching confirmation included in the control packet to the control portion 109. The control portion 109 receives the switching confirmation and then terminates processing for coding audio and/or video signals by using the first coding method.

Next, processing step S406 will be described. The select portion 103 supplies audio and/or video signals outputted from the input portion 102 to the second coding portion 104-2 but not to the first coding portion 104-1 in accordance with an instruction from the control portion 109. Further, the select portion 105 supplies coded data 813 outputted from the second coding portion 104-2 to the communication portion 106 in accordance with an instruction from the control portion 109. The communication portion 106 sequentially creates a data packet 810 including the coded data 813 and sequentially sends it to the packet communication apparatus 200. Since the packet communication apparatus 200 switches the coding method from the first coding method to the second coding method, the data packet 810 sent from the packet communication apparatus 100 can be decoded without any problems, which also can prevent the occurrence of noise, video turbulence and/or audio and/or video interruption.

Figure 5:
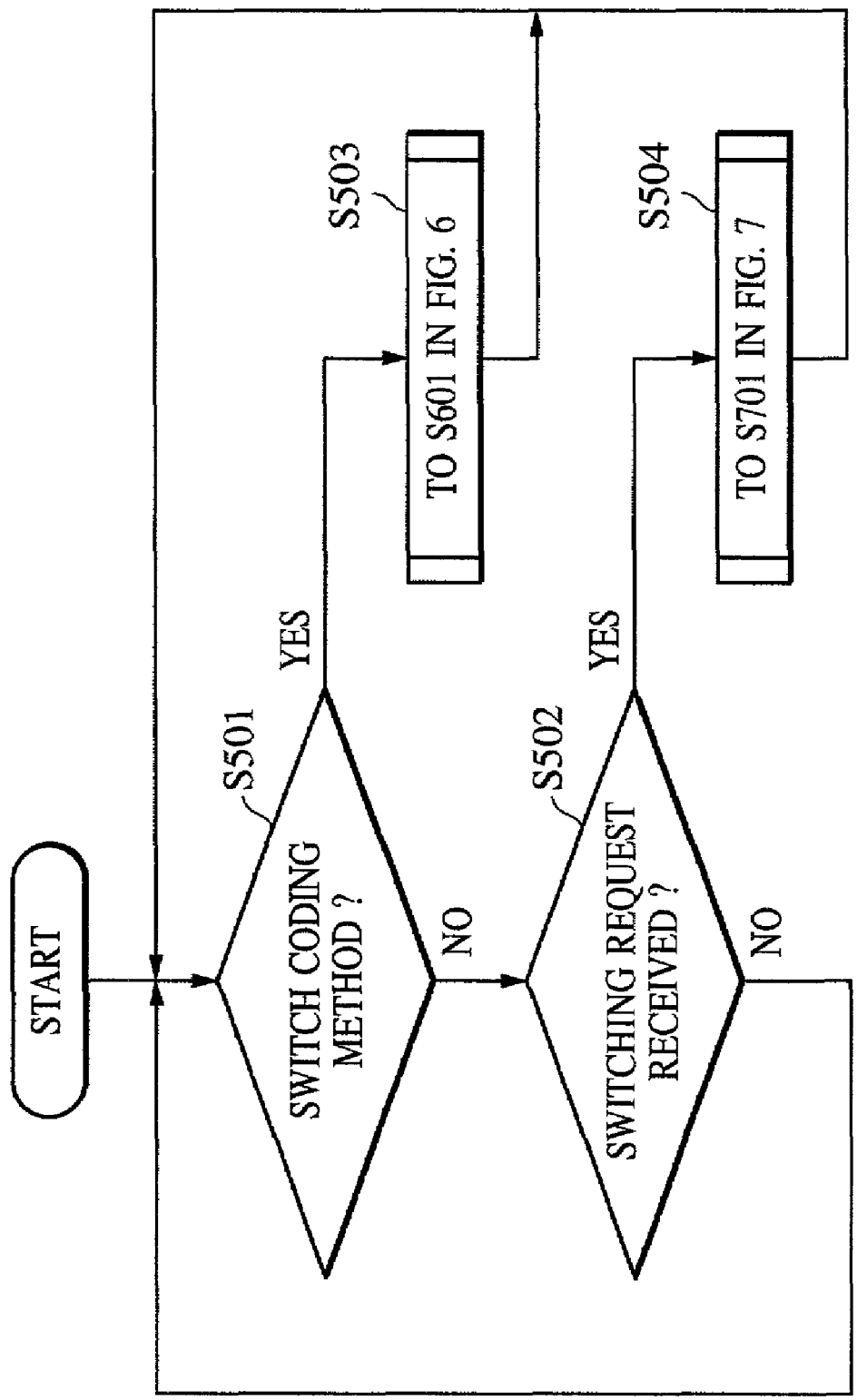
FIG. 5 is a flowchart for describing main processing steps of a packet communication apparatus according to the first embodiment of the present invention.

Next, a main processing step of the packet communication apparatus 100 (sending side) according to the first embodiment will be described by referring to the flowchart in FIG. 5.

In step S501, the control portion 109 determines whether or not the coding method must be switched from the first coding method to the second coding method. When the coding method is switched ("Yes" in step S501), the flowchart goes to a step S503. On the other hand, when the coding method is not switched ("No" in step S501), the flowchart goes to a step S502.

In the step S502, the control portion 109 determines whether or not a control packet including a switching request has been received or not. When the switching request has been received ("Yes" in step S501), the flowchart goes to a step S504. On the other hand, when the switching request has not been received ("No" in step S501), the flowchart goes to a step S501.

Figure 6:
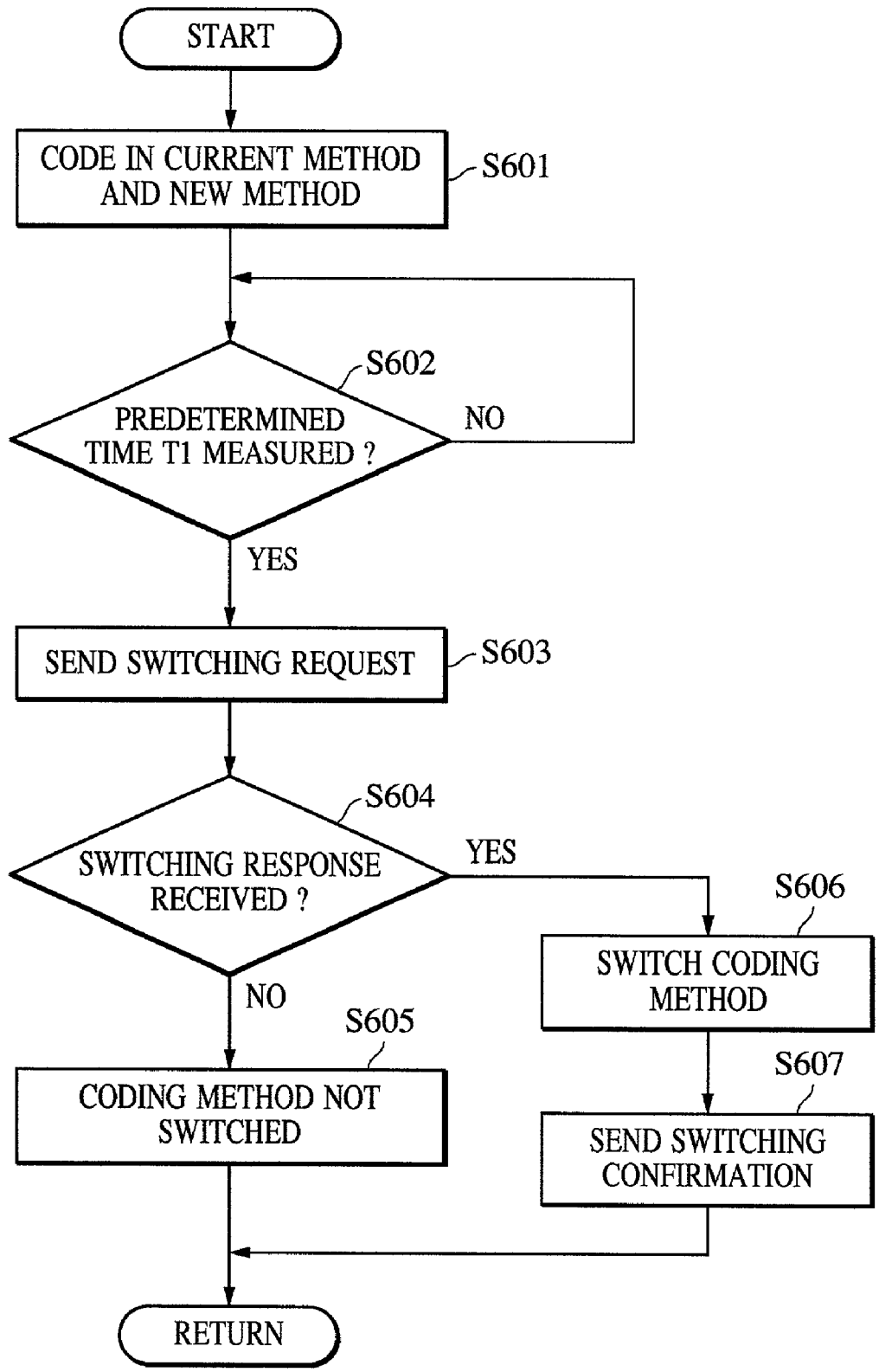
FIG. 6 is a flowchart for describing main processing steps of a packet communication apparatus according to the first embodiment of the present invention.

Next, a processing step S503 in FIG. 5 will be described by referring to a flowchart in FIG. 6.

In step S601, the control portion 109 starts preparation for coding audio and/or video signals having a same content by using a coding method before switching and a coding method after switching.

In a step S602, the control portion 109 determines whether or not a predetermined time T1 (a time sufficiently long enough for the coding processing by the coding portion 104-2 to become stable) has passed. If the predetermined time has passed ("Yes" in step S602), the flowchart goes to a step S603.

In the step S603, the control portion 109 supplies a switching request to the communication portion 106. The communication portion 106 creates a control packet including the switching request and sends it to the packet communication apparatus 200. After sending the switching request, the communication portion 106 starts sending audio and/or video signals coded by using the coding method before switching and audio/video signals coded by using the coding method after switching.

In step S604, the control portion 109 determines whether or not the control packet including a switching response could be received within a predetermined time. If the switching response could be received ("Yes" in step S604), the flowchart goes to a step S606. On the other hand, if the switching request could not be received ("Yes" in step S604), the flowchart goes to a step S605.

In the step S605, the control portion 109 controls the audio and/or video signals coded by using the coding method before switching to be sent to the packet communication apparatus 200. Further, the control portion 109 controls the audio/video signals coded by using the coding method after switching not to be sent to the packet communication apparatus 200.

In the step S606, the control portion 109 controls the audio and/or video signals coded by using the coding method before switched not to be sent to the packet communication apparatus 200. Further, the control portion 109 controls the audio and/or video signals coded after switched to be sent to the packet communication apparatus 200.

In a step S607, the control portion 109 supplies a switching confirmation to the communication portion 106. The communication portion 106 creates a control packet including the switching confirmation and then sends it to the packet communication apparatus 200 via the network 112.

Figure 7:
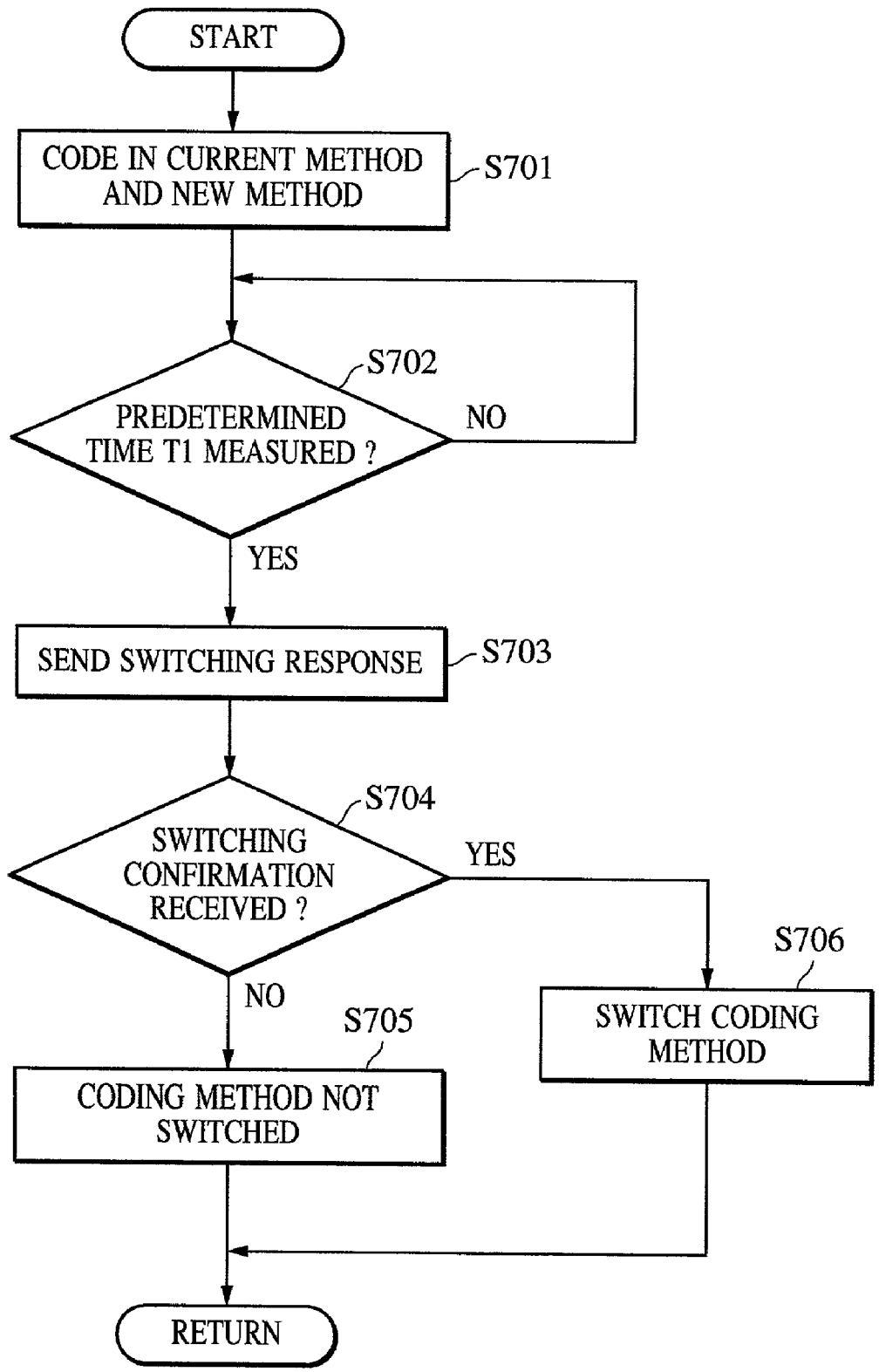
FIG. 7 is a flowchart for describing main processing steps of a packet communication apparatus according to the first embodiment of the present invention.

Next, a processing step S504 in FIG. 5 will be described by referring to a flowchart in FIG. 7.

In a step S701, the control portion 109 starts preparation for coding audio and/or video signals having a same content by using a coding method before switched and a coding method after switched.

In a step S702, the control portion 109 determines whether or not a predetermined time T1 (an amount of time sufficiently long enough for enabling a coding process by the coding portion 104-2 to become stable) has passed. If the predetermined time has passed, the flowchart goes to a step S703.

In the step S703, the control portion 109 supplies a switching response to the communication portion 106. The communication portion 106 creates a control packet including the switching response and then sends it to the communication apparatus 200 through network 112. After sending the switching response, the communication portion 106 starts sending audio and/or video signals coded by the coding method before switching and audio and/or video signals coded by using the coding method after switching.

In a step S704, the control portion 109 determines whether or not the control packet including a switching confirmation could be received within a predetermined time. If the switching confirmation could be received, the flowchart goes to a step S706. On the other hand, if the switching confirmation could not be received, the flowchart goes to a step S705.

In the step S705, the control portion 109 controls the audio and/or video signals coded by using the coding method before switching to cause those signals to be sent to the packet communication apparatus 200. Further the control portion 109 controls the audio/video signals coded by using the coding method after switching, so as to prevent those signals from being sent to the packet communication apparatus 200.

In the step S706, the control portion 109 controls the audio and/or video signals coded by using the coding method before switching, so as to prevent those signals from being sent to the packet communication apparatus 200. Further the control portion 109 controls the audio and/or video signals coded by using the coding method after switching so as to cause those signals to be sent to the packet communication apparatus 200.

As described above, according to the first embodiment, even when a coding method is switched during communication with the other party, the occurrence of noise, turbulence of video, and interruption of audio and/or video, could be prevented.

Further, according to the first embodiment, the audio and/or video signals coded by using a coding method after switching is not sent until a coding process becomes stable. Thus, even when a coding method feeding back past information is switched, the occurrence of noise, turbulence of video, and interruption of audio and/or video could be prevented.

Furthermore, according to the first embodiment, audio and/or video signals coded by using a coding method after switching can be sent without connecting a new call, which eliminates a need for complicated communication processes. Thus, the communication efficiency can be improved.

Embodiment 2

In the first embodiment, a case was described where audio and/or video signals coded by using a coding method before switching and audio and/or video signals coded by using a coding method after switching are packetized in separate data packets.

On the other hand, in a second embodiment of the invention, a case will be described where audio and/or video signals coded by using a coding method before switching and audio and/or video signals coded by using a coding method after switching are packetized in a same data packet.

Next, a construction of data packet according to the second embodiment will be described by referring to FIG. 9.

Figure 9:
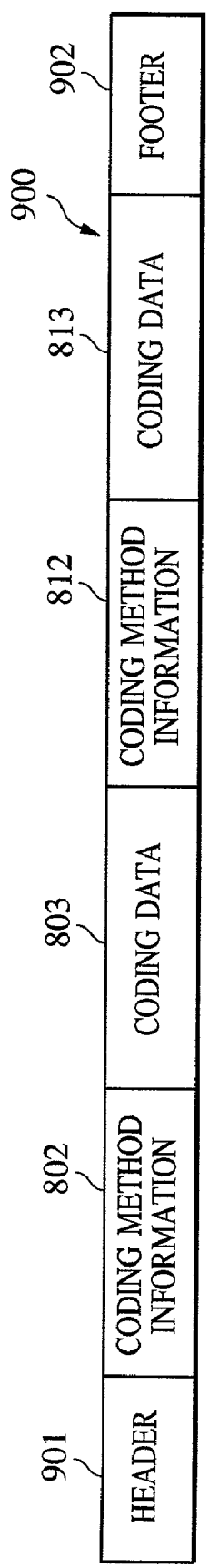
FIG. 9 is a diagram showing the construction of a data packet according to a second embodiment of the present invention.

As shown in FIG. 9, a data packet 900 according to the second embodiment includes a header 901, coding method information 802, coded data 803, coding method information 812, coded data 813, and a footer 902. The header 901 includes information for identifying the other communicating party, for example. The coding method information 802 includes information indicating a coding method for the corresponding thereto. The coded data 803 includes audio and/or video signals coded by using a coding method before switching (e.g., a first coding method of a first coding portion 104-1). The coding method information 812 includes information indicating a coding method for coded data 813 and a decoding method corresponding thereto. The coded data 813 includes audio and/or video signals coded by using a coding method after switching (e.g., a second coding method of a second coding portion 104-2). The footer 902 includes, for example, information for detecting or correcting an error occurred in a data packet.

Figure 10:
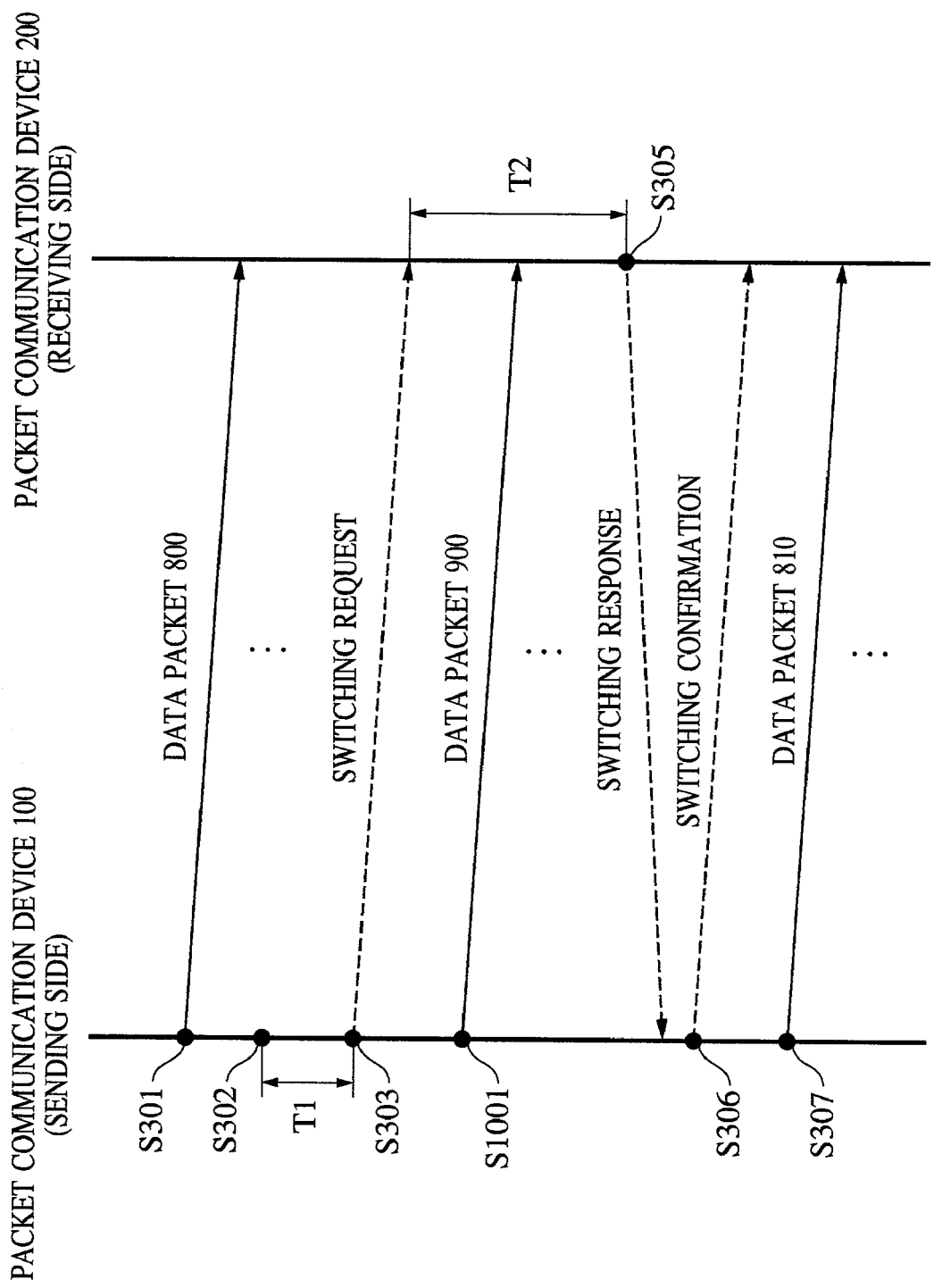
FIG. 10 is a diagram showing an example of main processing steps of a packet communication apparatus according to the second embodiment of the present invention.

Next, by referring to FIG. 10, an example will be described of main processing steps of packet communication apparatuses 100 and 200 according to the second embodiment. In FIG. 10, processing steps will be described for a case where, during communication with the packet communication apparatus 200 (receiving side), the packet communication apparatus 100 (sending side) requests switching of a coding method. Further, in FIG. 10, it is assumed that the coding method before switching is, for example, a first coding method of a first coding portion 104-1 and that the coding method after switching is, for example, a second coding method of a second coding portion 104-2. It should be noted that only processing steps that are different from the processing steps shown in FIG. 3 will be described hereinafter, and that processing steps that are similar to those in FIG. 3 are identified by the same reference numerals in FIGS. 3 and 10, and a further description of those steps will be omitted herein.

A processing step S1001 will now be described. The select portion 105 supplies coded data 803 outputted from the first coding portion 104-1 and coded data 813 outputted from the second coding portion 104-2 to the communication portion 106 in accordance with an instruction from the control portion 109. The communication portion 106 then creates a data packet 900 including the coded data 803 and the coded data 813 sequentially, and sends them to the packet communication apparatus 200 sequentially via network 112. The communication portion 106 then starts sending the data packet 900 without connecting a new call with the packet communication apparatus 200.

The communication portion 206 of apparatus 200 then sequentially receives the data packet 900 sent from the packet communication apparatus 100 and supplies coded data 803 and coded data 813 to the select portion 205 and coding method information 802 and 812 to the control portion 209. The control portion 209 determines a coding method for the coded data 803 and a decoding method corresponding thereto based on the coding method information 802. The select portion 205 supplies the coded data 803 to the first decoding portion 204-1 and supplies the coded data 813 to the second decoding portion 204-2 in accordance with an instruction from the control portion 209. The select portion 203 supplies audio and/or video signals outputted from the first decoding portion 204-1 to the output portion 202 but does not supply audio and/or video signals outputted from the second decoding portion 204-2 to the output portion 202, in accordance with an instruction from the control portion 209. The select portion 203 does not supply audio and/or video signals outputted from the second decoding portion 204-2 to the output portion 202 until a predetermined time T2 (an amount of time sufficiently long enough for enabling an operation of the second decoding portion 204-2 to become stable) has passed.

Figure 11:
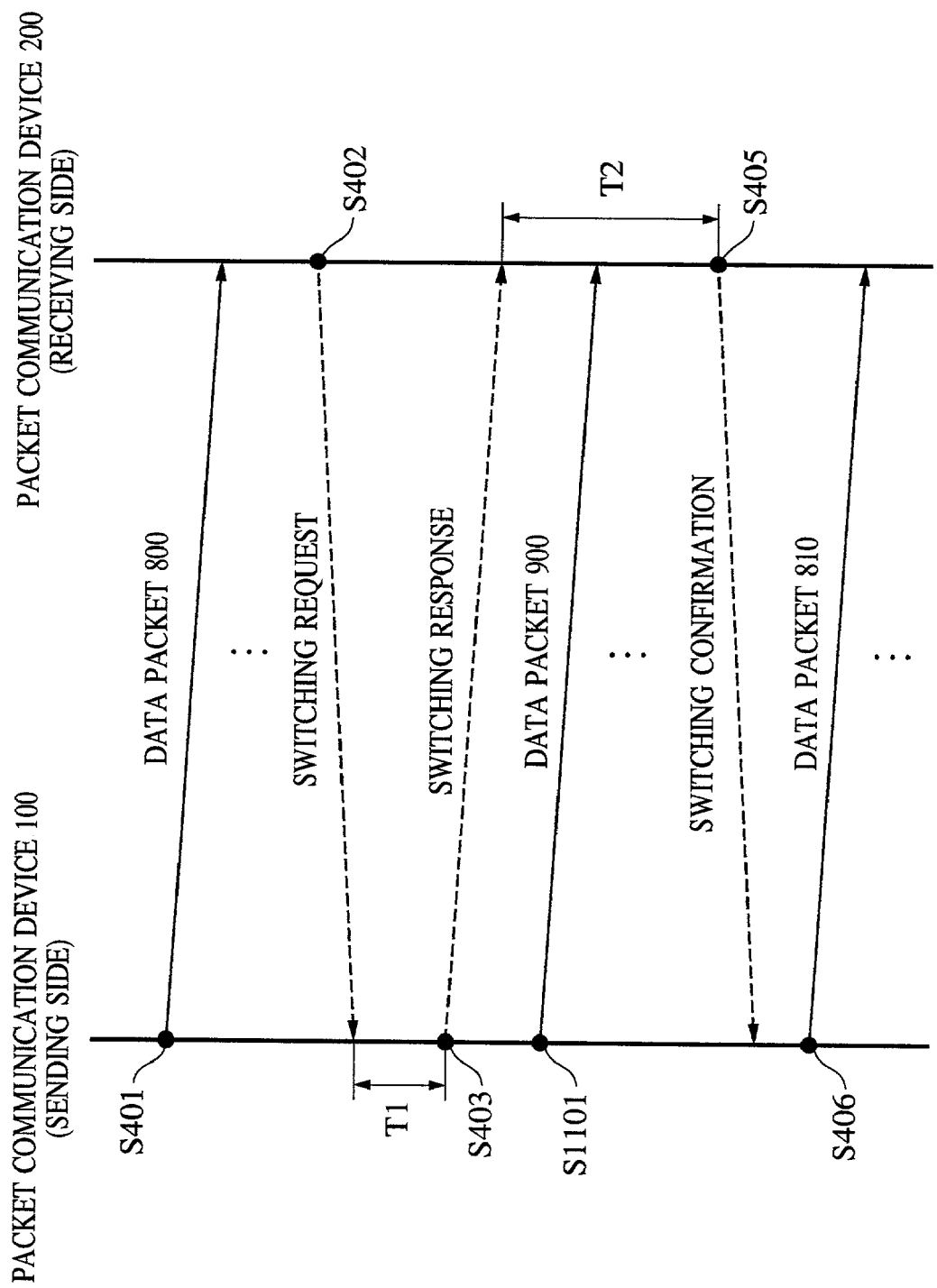
FIG. 11 is a diagram showing another example of main processing steps of a packet communication apparatus according to the second embodiment of the present invention.

Next, by referring to FIG. 11, another example of main processing steps of packet communication apparatuses 100 and 200 will be described according to the second embodiment of the invention. In FIG. 1, processing steps will be described in a case where, during communication with the packet communication apparatus 100 (sending side), the packet communication apparatus 200 (receiving side) requests switching of a coding method. Further, in FIG. 11, in the same manner as the description for FIG. 10, it is assumed that the coding method before switching is, for example, a first coding method of a first coding portion 104-1, and that the coding method after switching is, for example, a second coding method of a second coding portion 104-2. It should be noted that processing steps in FIG. 11, which are different from the processing steps shown in FIG. 4, will be described in detail herein, and that the same reference numerals are used in the following description for the processing steps of FIG. 11 that are similar to those in FIG. 4, and a detailed description of those steps will be omitted herein.

First, a processing step S1101 will be described. The select portion 105 supplies coded data 803 outputted from the first coding portion 104-1 and coded data 813 outputted from the second coding portion 104-2 to the communication portion 106 in accordance with an instruction from the control portion 109. The communication portion 106 creates a data packet 900 including the coded data 803 and the coded data 813 sequentially, and sends them to the packet communication apparatus 200 sequentially as part of the data packet 900. The communication portion 106 starts sending the data packet 900 without connecting a new call with the packet communication apparatus 200.

The communication portion 206 thereafter sequentially receives the data packet 900 sent from the packet communication apparatus 100 and supplies coded data 803 and coded data 813 to the select portion 205 and coding method information 802 and 813 to the control portion 209. The control portion 209 determines a coding method for the coded data 803 and a 10 decoding method corresponding thereto based on the coding method information 802. The select portion 205 supplies the coded data 803 to the first decoding portion 204-1 and supplies the coded data 813 to the second decoding portion 204-2 in accordance with an instruction from the control portion 209. The select portion 203 supplies audio and/or video signals outputted from the first decoding portion 204-1 to the output portion 202 but does not supply audio and/or video signals outputted from the second decoding portion 204-1 to the output portion 202, in accordance with an instruction from the control portion 209. The select portion 203 does not supply audio and/or video signals outputted from the second decoding portion 204-2 to the output portion 202 until a predetermined time period T2 (a time period sufficiently long enough for enabling the operation of the second decoding portion 204-2 to become stable) has passed.

As described above, according to the second embodiment, like the first embodiment, even when a coding method is switched during communication with another party, the occurrence of noise, turbulence of video, interruption of audio and/or video can be prevented.

Further, according to the second embodiment, audio and/or video signals coded by a coding method before switching and audio and/or video signals coded by a coding method after switching can be packetized in a same data packet. Thus, the communication efficiency is improved even more than that provided in the first embodiment.

Further, according to the second embodiment, like the first embodiment, the coding decoding method is not switched until a decoding process of a decoding method after switching becomes stable. Thus, even when the decoding method after switching is a decoding method feeding back past information, the occurrence of noise, turbulence of video, interruption of audio and/or video is prevented.

Furthermore, according to the second embodiment, audio and/or video signals coded by using a coding method after switching can be sent without connecting a new call, which eliminates a need for complicated communication processes. Thus, the communication efficiency can be improved.

Another Embodiment

It should be noted that a part or all of functions described in each of the above-described embodiments can be implemented by a control program. In such a case, the control portion within an apparatus described in each or the above-described embodiments uses the control program for implementing either part or all of functions described in each of the above-described embodiments to implement part or all of functions described in each of the above-described embodiments. In this case, a memory medium for storing the control program may be a floppy disk, a hard disk, an optical disk, a photo magnetic disk, a CD-ROM, a magnetic tape, a non-volatile memory card, or a ROM, for example.

The invention may be embodied in other specific forms without departing from essential characteristics thereof.

For example, in the above-described embodiments, a case has been described wherein a coding method before switching is a first coding method and a coding method after switching is a second coding method. However, the present invention is not limited thereto. It is possible that the coding method before switching is an $a^{th}$ (a=1 to N) coding method and the coding method after switching is $b^{th}$ (b=1 to N, b≠a).

Therefore, the above-described embodiments are merely exemplary of this invention, and are not to be construed to limit the scope of the present invention.

The scope of the present invention is defined by the scope of the appended claims, and is not limited to only the specific descriptions in this specification. Furthermore, all the modifications and changes belonging to equivalents of the claims are considered to fall within the scope of the present invention.

What is claimed is:

1. A communication apparatus comprising:
    first coding means for creating first coded data including an audio signal coded by a first audio coding method;
    second coding means for creating second coded data including an audio signal coded by a second audio coding method that is different from said first audio coding method;
    control means for switchably selecting at least one of the first coded data created by said first audio coding method and the second coded data created by said second audio coding method; and
    sending means for sending at least one of the first coded data and the second coded data to another communication apparatus,
    wherein said sending means sends the first coded data and the second coded data when said control means switches selection from said first audio coding method to said second audio coding method while said communication apparatus is in communication with the other communication apparatus, and
    wherein said control means does not select the second coded data until a predetermined time has passed since said second coding means starts creating the second coded data.

2. A communication apparatus according to claim 1, wherein said sending means sends the first coded data and the second coded data using different data packets.

3. A communication apparatus according to claim 1, wherein said sending means sends the first coded data and the second coded data using a same data packet.

4. A communication apparatus according to claim 1, wherein said sending means sends the first coded data and the second coded data without connecting a new call.

5. A communication apparatus according to claim 1, wherein the first coded data includes a video signal coded by a first video coding method while the second coded data includes a video signal coded by a second video coding method.

6. A method of operating a communication apparatus, the method comprising:
    a first coding step, of creating first coded data including an audio signal coded by a first audio coding method;
    a second coding step, of creating second coded data including an audio signal coded by a second audio coding method that is different from said first audio coding method;
    a control step, of switchably selecting at least one of the first coded data created by said first audio coding method and the second coded data created by said second audio coding method; and
    a sending step, of sending at least one of the first coded data and the second coded data to another communication apparatus,
    wherein said sending step includes sending the first coded data and the second coded data when said control step switches selection from said first audio coding method to said second audio coding method while said communication apparatus is in communication with the other communication apparatus, and
    wherein said control step does not select the second coded data until a predetermined time has passed since said second coding step has started creating the second coded data.

7. A method according to claim 6, wherein said sending step includes sending the first coded data and the second coded data using different data packets.

8. A method according to claim 6, wherein said sending step includes sending the first coded data and the second coded data using a same data packet.

9. A method according to claim 6, wherein said sending step includes sending the first coded data and the second coded data without connecting a new call.

10. A method according to claim 6, wherein the first coded data includes a video signal coded by a first video coding method while the second coded data includes a video signal coded by a second video coding method.

11. A communication apparatus comprising:
  receiving means for receiving at least one of first coded data including an audio signal coded by a first audio coding method and second coded data including an audio signal coded by a second audio coding method that is different from said first audio coding method;
  first decoding means for decoding the first coded data;
  second decoding means for decoding the second coded data;
  control means for switchably selecting at least one of an audio signal outputted from said first decoding means and an audio signal outputted from said second decoding means; and
  output means for outputting the audio signal selected by said control means,
  wherein said receiving means receives the first coded data and the second coded data when said control means switches selection from said first audio coding method to said second audio coding method while said communication apparatus is in communication with another communication apparatus, and
  wherein said control means does not select the audio signal outputted from said second decoding means until a predetermined time has passed since said second decoding means has started decoding the second coded data.

12. A communication apparatus according to claim 11, wherein said receiving means receives the first coded data and the second coded data using different data packets.

13. A communication apparatus according to claim 11, wherein said receiving means receives the first coded data and the second coded data using a same data packet.

14. A communication apparatus according to claim 11, wherein said receiving means receives the first coded data and the second coded data without connecting a new call.

15. A communication apparatus according to claim 11, wherein the first coded data includes a video signal coded by a first video coding method while the second coded data includes a video signal coded by a second video coding method.

16. A method of operating a communication apparatus, the method comprising:
  a receiving step, of receiving at least one of first coded data including an audio signal coded by a first audio coding method and second coded data including an audio signal coded by a second audio coding method that is different from said first audio coding method;
  a first decoding step, of decoding the first coded data;
  a second decoding step, of decoding the second coded data; and
  a control step, of switchably selecting at least one of an audio signal outputted in said first decoding step and an audio signal outputted in said second decoding step; and
  an output step, of outputting the audio signal selected in said control step,
  wherein said receiving step includes receiving the first coded data and the second coded data when said control step switches selection from said first audio coding method to said second audio coding method while said communication apparatus is in communication with another communication apparatus, and
  wherein said control step does not select the audio signal outputted in said second decoding step until a predetermined time has passed since said second decoding step starts decoding the second coded data.

17. A method according to claim 16, wherein said receiving step includes receiving the first coded data and the second coded data that are packetized in separate packets.

18. A method according to claim 16, wherein said receiving step includes receiving the first coded data and the second coded data that are packetized in a same packet.

19. A method according to claim 16, wherein said receiving step includes receiving the first coded data and the second coded data without connecting a new call.

20. A method according to claim 16, wherein the first coded data includes a video signal coded by a first video coding method while the second coded data includes a video signal coded by a second video coding method.

21. A communication apparatus comprising:
  a first coder, arranged for creating first coded data including an audio signal coded by a first audio coding method;
  a second coder, arranged for creating second coded data including an audio signal coded by a second audio coding method that is different from said first audio coding method;
  a controller, for switchably selecting at least one of the first coded data created by said first audio coding method and the second coded data created by said second audio coding method; and
  a sender, arranged for sending at least one of the first coded data and the second coded data to another communication apparatus, and
  wherein said sender sends the first coded data and the second coded data when said controller switches selection from said first audio coding method to said second audio coding method while said communication apparatus is in communication with the other communication apparatus, and
  wherein said controller does not select the second coded data until a predetermined time has passed since said second coder starts creating the second coded data.

22. A communication apparatus according to claim 21, wherein said sender sends the first coded data and the second coded data using different data packets.

23. A communication apparatus according to claim 21, wherein said sender sends the first coded data and the second coded data using a same data packet.

24. A communication apparatus according to claim 21, wherein said sender sends the first coded data and the second coded data without connecting a new call.

25. A communication apparatus according to claim 21, wherein the first coded data includes a video signal coded by a first video coding method while the second coded data includes a video signal coded by a second video coding method.

26. A communication apparatus comprising:
  a receiver, arranged for receiving at least one of first coded data including an audio signal coded by a first audio coding method and second coded data including an audio signal coded by a second audio coding method that is different from said first audio coding method;
  a first decoder, arranged for decoding the first coded data;
  a second decoder, arranged for decoding the second coded data;
  a controller, arranged for switchably selecting at least one of an audio signal outputted from said first decoder and an audio signal outputted from said second decoder; and
  an outputter, arranged for outputting the audio signal selected by said controller, wherein said receiver receives the first coded data and the second coded data when said controller switches selection from said first audio coding method to said second audio coding method while said communication apparatus is in communication with another communication apparatus, and wherein said controller does not select the audio signal outputted from said second decoder until a predetermined time has passed since said second decoder starts decoding the second coded data.

27. A communication apparatus according to claim 26, wherein said receiver receives the first coded data and the second coded data using different data packets.

28. A communication apparatus according to claim 26, wherein said receiver receives the first coded data and the second coded data using a same data packet.

29. A communication apparatus according to claim 26, wherein said receiver receives the first coded data and the second coded data without connecting a new call.

30. A communication apparatus according to claim 26, wherein the first coded data includes a video signal coded by a first video coding method while the second coded data includes a video signal coded by a second video coding method.

* * * * *

UNITED STATES PATENT AND TRADEMARK OFFICE
CERTIFICATE OF CORRECTION

| | | |
|---|---|---|
| PATENT NO. | : 7,058,078 B2 | Page 1 of 1 |
| APPLICATION NO. | : 09/840105 | |
| DATED | : June 6, 2006 | |
| INVENTOR(S) | : Toru Kikuchi | |

It is certified that error appears in the above-identified patent and that said Letters Patent is hereby corrected as shown below:

ON THE TITLE PAGE [54]:

Title, "OPERATING A" should read --OPERATING--.

COLUMN 1:

Line 2, "OPERATING A" should read --OPERATING--.

COLUMN 2:

Line 13, "fire" should read --first--.

Signed and Sealed this

First Day of May, 2007

JON W. DUDAS
*Director of the United States Patent and Trademark Office*